United States Patent [19]
Mathieu

[11] 3,997,789
[45] Dec. 14, 1976

[54] NEUTRON-IRRADIATION DOSE MONITOR COMPRISING THERMOCOUPLES

[75] Inventor: Francois Gaspard Mathieu, Mol, Belgium

[73] Assignee: Centre d'Etude de l'Energie Nucleaire, "C.E.N.", Brussels, Belgium

[22] Filed: Apr. 26, 1974

[21] Appl. No.: 464,444

[30] Foreign Application Priority Data
Apr. 27, 1973   Belgium .............................. 798823

[52] U.S. Cl. .............................................. 250/390
[51] Int. Cl.² ........................................ G01T 3/00
[58] Field of Search ................... 250/390, 391, 392

[56] References Cited
UNITED STATES PATENTS

| | | | |
|---|---|---|---|
| 3,028,494 | 4/1962 | Wickersham et al. | 250/390 |
| 3,564,246 | 2/1971 | Morrison | 250/392 |

*Primary Examiner*—Davis L. Willis
*Attorney, Agent, or Firm*—Stevens, Davis, Miller & Mosher

[57] ABSTRACT

A neutron-irradiation dose monitor is described as comprising a first couple of wires of different nature, soldered to one another by the one end thereof and a second couple of wires of different nature, soldered to one another by the one end thereof, the wires of both couples having thermo-electric properties that vary differently according to the integrated neutron flow.

4 Claims, 3 Drawing Figures

NEUTRON-IRRADIATION DOSE MONITOR COMPRISING THERMOCOUPLES

This invention pertains to a neutron-irradiation dose monitor.

In the present specification, by neutron-irradiation dose monitor should be understood an element or set of elements which under the action of the neutron-irradiation undergo a measurable transformation. The measure of such transformation allows to know the irradiation dose to which the monitor has been exposed.

The neutron-irradiation dose monitor according to the invention differs from the known monitors notably by an easy manufacturing and by the easy application inside a reactor or generally inside an irradiation area.

A main advantage of the neutron-irradiation dose monitor according to the invention lies in said monitor giving measuring outputs during the irradiation, which allows better programming of the irradiation duration. The monitor according to the invention is suitable for a continuous and local real-time measuring.

For this purpose, the neutron-irradiation dose monitor according to the invention comprises a first couple of wires of different nature, soldered to one another by the one end thereof and a second couple of wires of different nature, soldered to one another by the one end thereof, the wires of both couples having thermo-electric properties that vary differently according to the integrated neutron flow.

In a preferred embodiment of the invention, the monitor comprises a refractory insulating material surrounding the soldered junctions of both couples and a portion of the wire length, as well as a protecting sheath surrounding said refractory insulating material.

In an advantageous embodiment, the monitor comprises a couple of wires the thermo-electric properties of which vary substantially according to the integrated neutron flow and a couple of wires the thermo-electric properties of which do not vary substantially according to the integrated neutron flow.

In a particular embodiment of the invention, the monitor comprises as wire couple the thermo-electric properties of which vary substantially according to the integrated neutron flow, a couple formed by platinum wire and a rhodium-platinum wire.

In a very particular embodiment of the invention, the monitor comprises as wire couple the thermo-electric properties of which do not substantially vary with the integrated neutron flow, a couple formed by a Chromel wire formed from an alloy of chromium and nickel containing 10–20 percent chromium and an Alumel wire formed from an alloy of aluminum and nickel containing 2% Ni, 2% Mn and 1% Si.

In a vary advantageous embodiment, the monitor comprises means for locally heating the couples.

Other details and features of the invention will stand out from the description given below by way of non limitative example and with reference to the accompanying drawings, in which.

Figure 3:
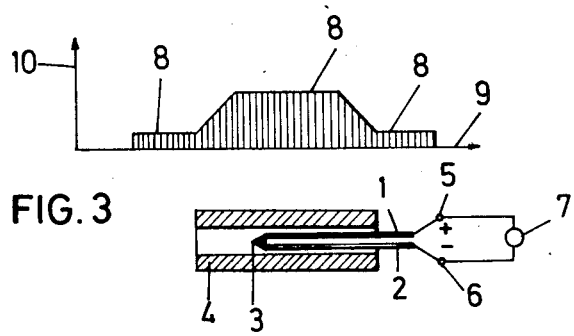
FIG. 3 is a diagrammatic showing of an oven, a wire couple and a curve showing the temperature profile along the oven lengthwise axis.

The wires 1 and 2 shown in FIG. 3 are soldered to one another by the one end thereof. The soldered junction is shown in 3. The wire couple lies partly inside an oven 4 and partly outside said oven. Those ends of the wires 1 and 2 that lie outside the oven 4 comprise terminals 5 and 6 to which is connected a voltage-measuring instrument 7.

The curve 8 shows diagrammatically a temperature axis and the axis 9 gives that point on the oven geometrical axis to which corresponds said temperature.

The voltage measured by the instrument 7 connected to terminals 5 and 6 corresponds to the electromotive force generated in the couple. Such electromotive force is a function, generally a non-linear function of the temperature differential between the soldered junction 3 on the one hand and the temperature outside the oven 4, thus the temperature of terminals 5 and 6, on the other hand. For a given temperature differential, the electromotive force will be dependent on the nature of the wires comprising the couple; said electromotive force further depends on the neutron-irradiation dose to which the wire couple has been exposed. To each wire couple corresponds an array of curves giving the relationships between the temperature differential of the soldered junction 3 and the terminals 5 and 6 on the one hand and the generated electromotive force, on the other hand. In each array, one curve corresponds to a given irradiation dose.

There is thus a curve array for the couple comprised of a platinum wire and a rhodium-platinum wire. There is another curve array for the couple comprised of a Chromel wire and an Alumel wire.

Figure 2:
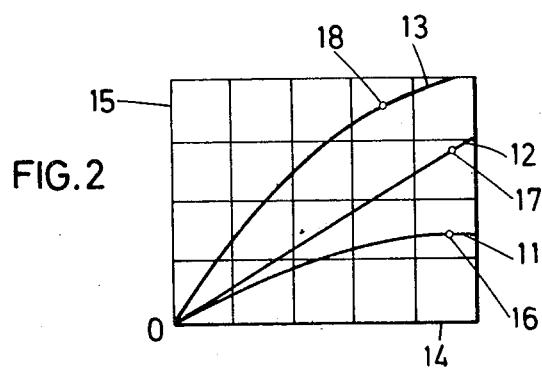
FIG. 2 is a diagram pertaining to the thermo-electric properties of a wire couple.

Such a curve array is shown in FIG. 2.

In said FIG. 2, the curves 11, 12 and 13 show the relationship between the temperature differential of the soldered junction 3 and the terminals 5 and 6 on the one hand and the generated electromotive force which is measured across terminals 5 and 6, on the other hand.

The temperature differential is thus the differential between the temperature inside the oven and the temperature outside.

In FIG. 2, said temperature differentials are shown in abcissae, thus along axis 14, while the electromotive forces are shown in ordinates, thus along axis 15.

Each one of the points 16, 17 and 18 thus gives the electromotive force generated in one and the same couple. Said electromotive force corresponds to the point ordinate; said electromotive force is generated under the action of a temperature diffential shown by the point abcissa and the curve proper corresponds to an irradiation dose to which the couple has been exposed.

For some couples - it is notably the case for the couple formed by a platinum wire and a rhodium-platinum wire - the thermo-electric properties vary substantially according to the integrated neutron flow. With such a wire couple, the curves in the array spread markedly from one another.

With other wire couples - it is notably the case with the couple comprised of a Chromel wire and an Alumel wire - the thermo-electric properties do not vary substantially according to the integrated neutron flow. With such a couple, the curves in the array do not spread substantially from one another and they can even merge into a single curve.

The electromotive forces are for example in the range of tens of microvolts per ° C, for instance about 40 millivolts/1000° C for the Chromel/Alumel couple and about 10 millivolts/1000° C for the platinum/rhodium-platinum couple.

The irradiation doses normally applied do not influence substantially the electromotive force from the Chromel/Alumel couple, but they influence the electromotive forces from the platinum/rhodium-platinum couple to a rate reaching up to 100 percent and more.

The monitor shown in FIG. 1 comprises besides the sheath 19 of stainless steel and the refractory insulating material 20, two wire couples the composition of which is further described hereinbelow. Said couples are imbedded in the refractory insulating material 20 which is covered by the protecting sheath 19 which is closed on the side of the couple soldered junctions. The refractory insulating material is for example magnesia or alumina.

The first wire couple comprises a platinum wire 21 and a rhodium-platinum wire 22, the thermo-electric properties of which vary substantially according to the integrated neutron flow.

The second wire couple comprises a Chromel wire 23 and an Alumel wire 24, the thermo-electric properties of which do not vary substantially according to the integrated neutron flow.

The electromotive force measured across the wire couple 23-24 allows to determine the temperature to which said couple is exposed whatever the neutron dose. Indeed said electromotive force is not influenced by said dose. Said wire couple is thus actually just a thermocouple. The electromotive force across the wire couple 21-22 depends on the neutron dose and the temperature, but such temperature is known from the electromotive force across the thermocouple 23-24.

The assembly of the two wire couples consequently provides a neutron dose monitor which can work continuously in real time.

The protecting sheath 19 surrounding the refractory insulating material 20 is surrounded over part of the length thereof by a heating coil 25.

Figure 1:
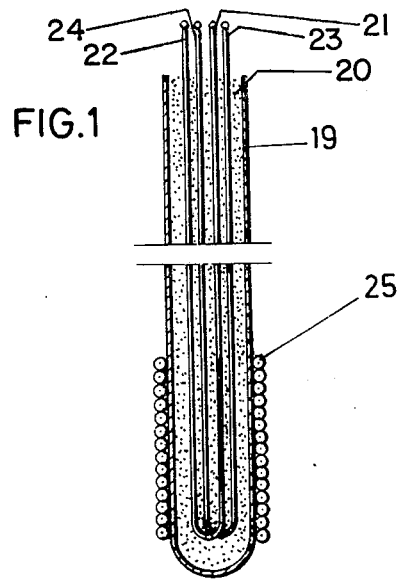
FIG. 1 is a diagrammatic showing of a neutron-irradiation dose monitor according to the invention.

The monitor shown in FIG. 1 can be used in various ways in irradiation devices. In any case the terminals of wire couple 21-22 are connected to a voltage measuring instrument and the terminals of the wire couple 23-24 are connected to another voltage measuring instrument.

It is for instance possible to combine a monitor according to FIG. 1 with a device for traversing same relative to the irradiation device and relative to the test contents which is to be exposed to an irradiation with said device.

By moving the monitor and by measuring the electromotive forces across the thermocouples 21-22 and 23-24, it is possible for example by means of an electronic sorting device to which are fed the electromotive forces across both couples, to compute the local neutron doses.

It is further possible to arrange various monitors according to FIG. 1 at different levels inside an irradiation device and by means of a device for sorting the electromotive forces obtained, it is possible to continuously determine the local irradiation doses by various height levels.

During these operations, it is possible to leave the heating coil 25 unoperative.

It is also possible to energize the heating coil for instance between the irradiation operations so as to determine between such operations the already-integrated irradiation dose. The heating coil 25 then works as an oven generating the required temperature gradient to generate electromotive forces across the wire couples 21-22 and 23-24.

It is to be noticed that the curve arrays for the wire couples only depend on the nature of the wires comprising the couple. Said curves can be plotted for the various materials according to a calibration by means of known monitors, for example monitors of another type and by temperature measuring by means of usual means.

It must be understood that the invention is in no way limited to the above embodiments and that many changes can be brought therein without departing from the scope of the invention as defined by the appended claims.

For instance the heating coil arranged on the outside of the sheath comprising the local heating means can be replaced by a wire embedded in the refractory insulating material and the two ends of which project from said insulating material.

It is not absolutely required that the thermo-electric properties of the one wire couple do not vary substantially according to the integrated neutron flow.

It is however essential that the thermo-electric properties of both wire couples vary differently according to the integrated neutron flow, so as to allow determining the temperature and the irradiation dose from the electromotive forces generated by both wire couples.

The platinum (rhodium-platinum couple can notably be replaced by a tungsten/rhenium tungsten couple.

I claim:

1. A neutron irradiation dose monitor comprising a first thermocouple comprising two dissimilar wires, each of these wires having two terminals, the two wires being jointed at one of their respective terminals in order to form a soldered junction, the two remaining terminals being free, the wires of said first thermocouple creating an electromotive force if the temperature of the soldered junction differs from the temperature of the two remaining terminals, said electromotive force being substantially independent of previous neutron irradiations of said first thermocouple, and a second thermocouple not connected to said first thermocouple comprising two different dissimilar wires, each of these wires having two terminals, the two wires being joined at one of their respective terminals in order to form a soldered junction, the two remaining terminals being free, the wires of said second thermocouple creating an electromotive force if the temperature of the soldered junction of this second thermocouple differs from the temperature of the two remaining terminals of said second thermocouple, the electromotive force created by the second thermocouple depending on previous neutron irradiations of said second thermocouple.

2. The neutron-irradiation dose monitor of claim 1 wherein said first thermocouple comprises a wire of an alloy of chromium and nickel and a wire of an alloy of aluminum and nickel.

3. The neutron-irradiation dose monitor of claim 1 wherein said second thermocouple comprises a wire of platinum and a wire of an alloy of rhodium-platinum.

4. The neutron-irradiation dose monitor of claim 1 including a refractory insulating material surrounding the soldered junctions of both couples and a portion of the length of the wires of the thermocouples, a protecting sheath surrounding the refractory insulating material, and a heating coil arranged outside the protecting sheath.

* * * * *